G. K. Proctor,
Treadle.
No. 112,488.    Patented Mar. 7, 1871.

Witnesses:
John Becker
Wm H. C. Smith

Inventor:
G. K. Proctor
per Munn & Co.
Attorneys.

UNITED STATES PATENT OFFICE.

GEORGE KENDALL PROCTOR, OF SALEM, MASSACHUSETTS.

IMPROVEMENT IN TREADLES.

Specification forming part of Letters Patent No. 112,488, dated March 7, 1871.

*To all whom it may concern:*

Be it known that I, GEORGE KENDALL PROCTOR, of Salem, in the county of Essex and State of Massachusetts, have invented a new and Improved Treadle-Motion; and I do hereby declare that the following is a full, clear, and exact description thereof, which will enable others skilled in the art to make and use the same, reference being had to the accompanying drawing, forming part of this specification.

This invention relates to improvements in treadle-motion for sewing-machines and other light machinery; and it consists in one treadle connected at one end to the crank by a pitman or connecting-rod rising nearly vertical, and another treadle having a rigid vertical bar about as high as the shaft of the wheel, and connected to the crank by a pitman nearly perpendicular to the other pitman, the said arrangement being calculated to give a more even application of power than other arrangements.

Figure 1:
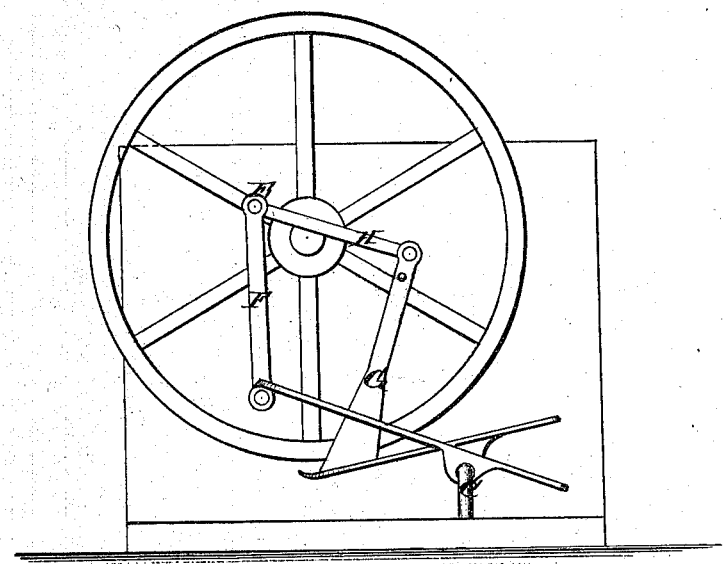
Figure 2:
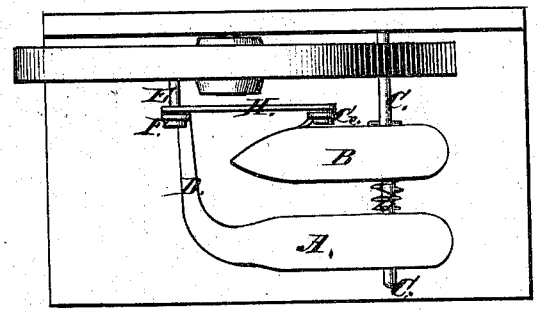

Figure 1 is a side elevation of my improved treadle apparatus, and Fig. 2 is a plan view of the same.

Similar letters of reference indicate corresponding parts.

A is one treadle, and B the other. Both are mounted on the same support, C. The one A has an arm, D, turned from the toe around in front of the toe of B, which arm is connected to the wrist-pin E by a connecting-rod, F, working nearly vertically, or vibrating at the upper part each way from a vertical line.

The treadle B has a strong arm, G, rigidly connected to it near the toe, and rising about as high as the shaft or axis of the balance-wheel, and at some distance therefrom horizontally. The upper end, which vibrates toward and from the axis, is connected to the wrist-pin by a connecting-rod, H, which works nearly perpendicular to the rod F, so that I am enabled to have the connecting-rods nearly at right angles, while the movements of the treadles are in exactly opposite directions, while, if both connected as A is, which is the common way, the power of both would apply and cease at the same time; whereas by my plan the power of one treadle is applied while the other is passing the dead-points.

Having thus described my invention, I claim as new and desire to secure by Letters Patent—

The connection of one treadle, A, to the crank by the ordinary connecting-rod F, and the other, B, by the rigid arm and the connecting-rod H, all substantially as specified.

GEORGE KENDALL PROCTOR.

Witnesses:
 FRANKLIN D. HAMILTON,
 WM. O. PERKINS.